(12) United States Patent
Andreasson et al.

(10) Patent No.: US 7,221,810 B2
(45) Date of Patent: May 22, 2007

(54) METHOD AND DEVICE FOR RECORDING OF INFORMATION

(75) Inventors: Markus Andreasson, Lund (SE); Per Åstrand, Lund (SE)

(73) Assignee: Anoto Group AB, Lund (SE)

( * ) Notice: Subject to any disclaimer, the term of this patent is extended or adjusted under 35 U.S.C. 154(b) by 772 days.

(21) Appl. No.: 10/054,284

(22) Filed: Nov. 13, 2001

(65) Prior Publication Data

US 2002/0094133 A1 Jul. 18, 2002

Related U.S. Application Data

(60) Provisional application No. 60/257,837, filed on Dec. 21, 2000.

(30) Foreign Application Priority Data

Nov. 13, 2000 (SE) .................................. 0004144

(51) Int. Cl.
*G06K 9/36* (2006.01)

(52) U.S. Cl. ...................... 382/284; 382/294; 358/540; 358/450

(58) Field of Classification Search ................ 382/275, 382/278, 281, 282, 284, 309, 313, 236, 238, 382/234, 294, 203, 209, 217, 229, 308, 293; 358/3.26, 538, 540, 453, 474, 450, 452
See application file for complete search history.

(56) References Cited

U.S. PATENT DOCUMENTS

| | | | |
|---|---|---|---|
| 4,379,282 A | | 4/1983 | Bailey |
| 4,903,312 A | * | 2/1990 | Sato .......................... 382/170 |
| 4,949,391 A | | 8/1990 | Faulkerson |
| 5,054,104 A | * | 10/1991 | Yamaguchi ................. 382/309 |
| 5,113,492 A | * | 5/1992 | Ariki et al. ................. 715/520 |
| 5,151,579 A | * | 9/1992 | Maginness .................. 235/375 |
| 5,159,180 A | * | 10/1992 | Feiler .......................... 235/375 |
| 5,216,725 A | | 6/1993 | McCubbrey |
| 5,220,621 A | * | 6/1993 | Saitoh ........................ 382/200 |
| 5,301,243 A | | 4/1994 | Olschafskie |
| 5,491,760 A | * | 2/1996 | Withgott et al. ............ 382/203 |
| 5,555,362 A | * | 9/1996 | Yamashita et al. .......... 715/517 |
| 5,563,403 A | * | 10/1996 | Bessho et al. ........... 250/208.1 |
| 5,583,956 A | * | 12/1996 | Aghajan et al. ............ 382/290 |

(Continued)

FOREIGN PATENT DOCUMENTS

WO    WO-9820446    5/1998

(Continued)

OTHER PUBLICATIONS

El Gowely, K.; El Dessouki, O.; and Nazif, A. (1990). Multi-Phase Recognition of Multi-FOnt Photscript Arabic Text. IEEE Comput. Soc. Press, USA 1:700-702.

*Primary Examiner*—Samir Ahmed
*Assistant Examiner*—Yosef Kassa
(74) *Attorney, Agent, or Firm*—Birch, Stewart, Kolasch & Birch, LLP

(57) ABSTRACT

A device and a method for recording of text by imaging the text on a light-sensitive sensor (8). The device converts the images (14–17, 47–49) into a set of characters (50, 51) each using character recognition, and then assembling the acts of characters (50, 51) with the aid of the characters.

29 Claims, 5 Drawing Sheets

U.S. PATENT DOCUMENTS

| | | | |
|---|---|---|---|
| 5,612,720 A * | 3/1997 | Ito et al. | 345/179 |
| 5,613,016 A * | 3/1997 | Saitoh | 382/174 |
| 5,675,672 A * | 10/1997 | Nakabayashi | 382/318 |
| 5,680,479 A * | 10/1997 | Wang et al. | 382/176 |
| 5,701,500 A * | 12/1997 | Ikeo et al. | 715/517 |
| 5,770,841 A * | 6/1998 | Moed et al. | 235/375 |
| 5,848,184 A * | 12/1998 | Taylor et al. | 382/173 |
| 5,991,453 A * | 11/1999 | Kweon et al. | 382/250 |
| 5,999,666 A * | 12/1999 | Gobeli et al. | 382/313 |
| 6,151,611 A * | 11/2000 | Siegel | 715/541 |
| 6,236,993 B1 * | 5/2001 | Fanberg | 707/6 |
| 6,279,828 B1 * | 8/2001 | Fann | 235/462.01 |
| 6,516,097 B1 * | 2/2003 | Pritt | 382/256 |
| 6,549,304 B1 * | 4/2003 | Dow et al. | 358/473 |
| 6,603,464 B1 * | 8/2003 | Rabin | 345/179 |

FOREIGN PATENT DOCUMENTS

WO     WO-9957678     11/1999

* cited by examiner

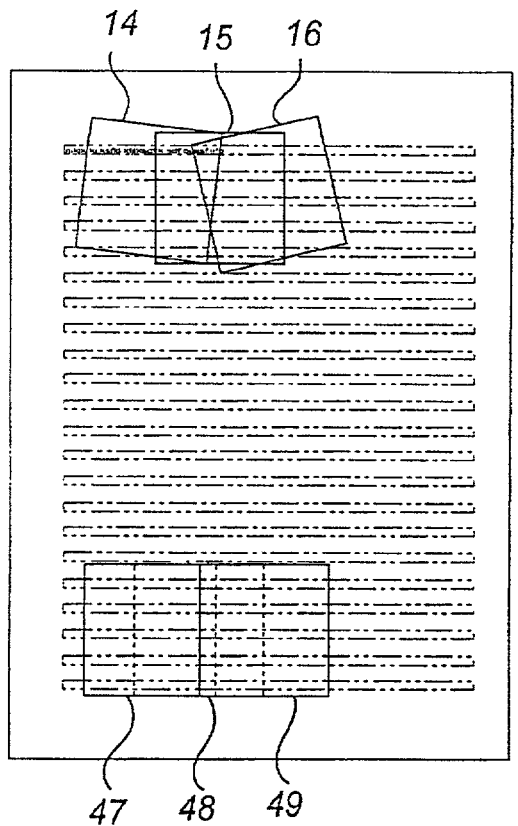
*Fig. 3*
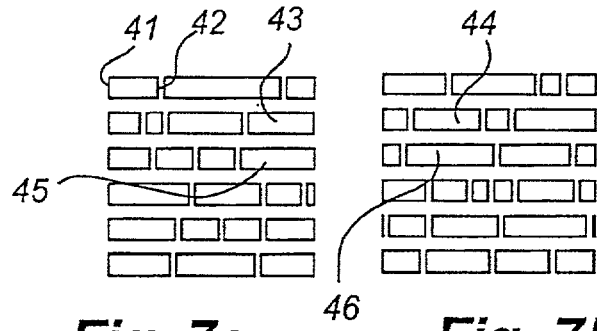
*Fig. 8*
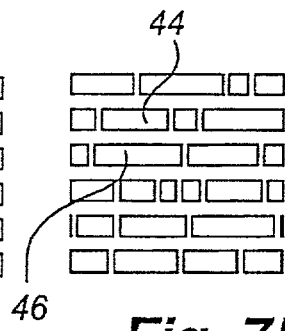
*Fig. 7a*  *Fig. 7b*

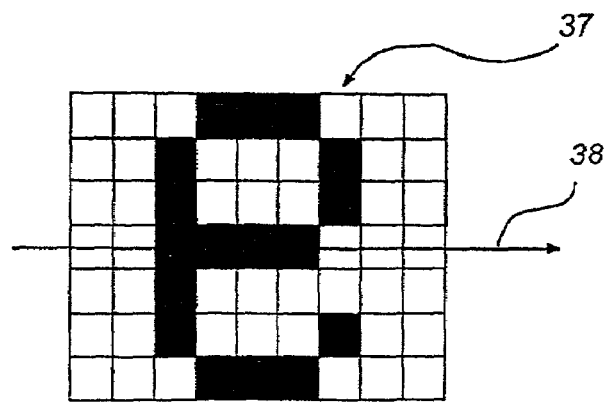
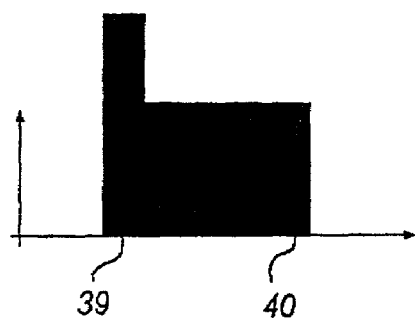
Fig. 6
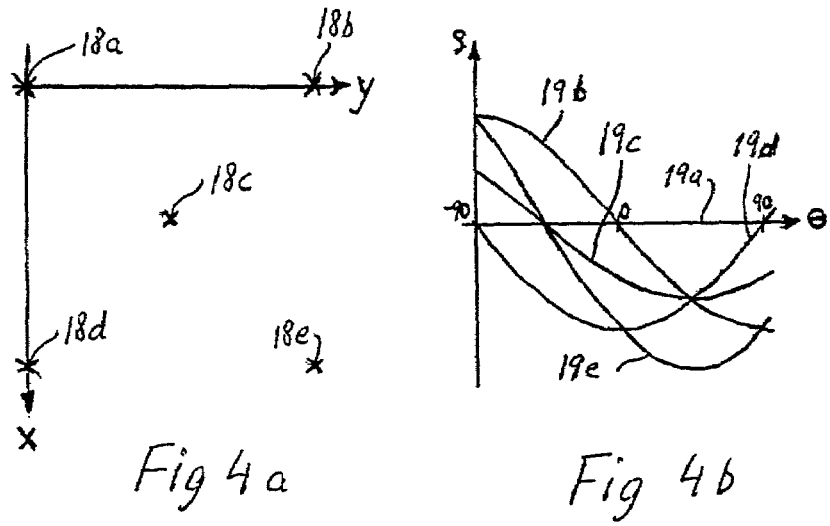
Fig 4a
Fig 4b
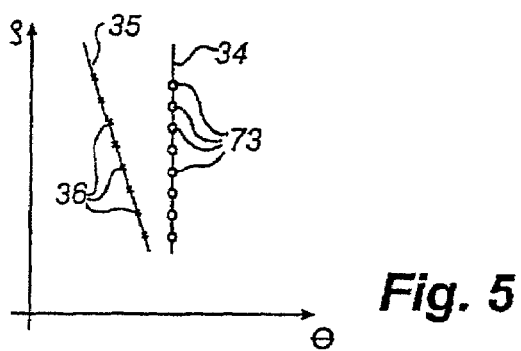
Fig. 5

US-5,301,243 discloses a hand-held scanner for reading characters from a string of characters on a substrate. The scanner is moved in contact with the substrate along the character line and has an optical system which images a small part of the substrate. The optical system comprises a CCD type line sensor provided with a plurality of light-sensitive elements arranged in a line. When the scanner is passed across the characters on the substrate, a succession of vertical slices of the characters and of the spaces between them is recorded.

Fig 11a

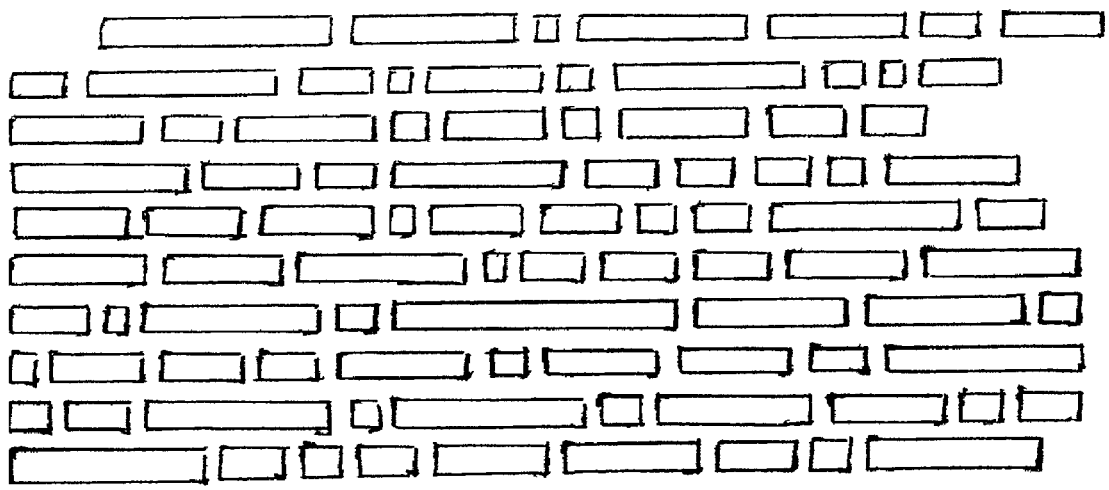

Fig. 11b

Fig 11c

29

METHOD AND DEVICE FOR RECORDING OF INFORMATION

CROSS REFERENCE TO RELATED APPLICATIONS

This application claims the benefit of U.S. Provisional Application No. 60/257,837, filed Dec. 21, 2000.

TECHNICAL FIELD OF THE INVENTION

The present invention relates to a method and a device for recording of text by imaging the text on an optical sensor in a handheld device, said sensor being intended for digital recording of images.

BACKGROUND OF THE INVENTION

It is sometimes desired to abstract parts of text or image information in a document which may later be edited using appropriate software in a computer. A known method of inputting text and image information into a computer is to use a stationary or portable scanner.

A stationary scanner is suitable for entering entire pages with text and image information, the scanner being automatically passed across the page at a constant speed. This type of scanner is not suited for inputting selected parts of information on a page.

A portable, handheld scanner may be used any time interesting information is to be scanned, but normally has a limited field of view.

U.S. Pat. No. 5,301,243 discloses a hand-held scanner for reading characters from a string of characters on a substrate. The scanner is moved in contact with the substrate along the character line and has an optical system which images a small part of the substrate. The optical system comprises a CCD type line sensor provided with a plurality of light-sensitive elements arranged in a line. When the scanner is passed across the characters on the substrate, a succession of vertical slices of the characters and of the spaces between them is recorded. The slices are stored in the scanner as a digital bit-map image. OCR software (OCR=Optical Character Recognition) is then used to identify the characters and store them in character-coded form, such as ASCII code. The character recognition can be made either in the scanner or in an external computer to which the bit-map image is sent.

Another type of hand-held scanner for inputting text is disclosed in U.S. Pat. No. 4,949,391. This scanner has a two-dimensional sensor which records images of the underlying surface as the scanner is being moved across the same. The scanner is restricted to movements in a direction which is determined by a wheel in contact with the surface. Before the recorded images are assembled into a composite image, redundant information is removed from the images. The composite image can be analyzed in a computer for identification of characters.

A drawback with the handheld scanners described above is that their field of view is relatively small. In order to record a large amount of information, such as passages consisting of several lines, a user must therefore move the scanner back and forth across the surface repeatedly. Moreover, the movement has to follow a predetermined path, such as along the lines of text.

Publication WO 99/57675 discloses a device for recording information from a substrate The device may operate in two modes, one scanner mode, in which lines of text is scanned, and a photograph mode, in which separate pictures are taken of a document or an object.

Publication WO 98/20446 discloses a scanner pen, which is adapted to be moved over a line of text for scanning the text. As the pen moves over the text image, several pictures are taken of the text. The pictures are processed by a computer and assembled or stitched together for forming a composite image of the entire line of text, which cannot be read by a single picture. The scanner pen can only scan a single line of text at each time.

Thus, there is a need for a handheld scanner pen of the above-mentioned type which is adapted to scan several lines of text simultaneously as well as smaller pictures.

SUMMARY OF THE INVENTION

An object of the present invention is to provide a scanner pen which enable fast recording of text in real time.

Another object of the invention is to provide a scanner pen which may be used at a distance from the text and may scan several lines of text in a single stroke as well as discrete pictures, These objects are obtained by a method and a device for recording information by imaging on a light-sensitive sensor for obtaining at least two images of the information having partially overlapping contents. The method comprises converting the information in each of the images to a coded representation, comparing the coded representation of said images for determining an overlap position, and assemblying the images to form a composite image. The coded representation may be a character code, such as ASCII. Alternatively, the coded representation may comprise a division of the information inside boarders, such as rectangles, each comprising portions of the information, such as words included in said information. Thereafter, the composite image may be converted to a character code format, such as ASCII-code. Alternatively, each image may be separetly converted into character code format, such as ASCII, before assemblying.

The method may further comprise determining structures in each of said images, such as direction of lines or text line directions in each image. This may be accomplished by means of a Hough transformation of each image. This information may be used for adjusting the rotational position and/or perspective of each image in dependence of the direction of lines. The information may also be used for the division of the image in reactangles.

A concept of the present invention is to record a plurality of images of a text, said images overlapping each other, each image comprising several lines of text. Subsequently, OCR (Optical Character Recognition) is carried out as regards the recorded images, resulting in sets of characters. The sets of characters may contain a number of characters indicating "end of line" if the text comprises several lines. Then the sets of characters are assembled using the characters in the sets of characters. An advantage of this mode of operation is that relatively large images can be recorded at a time, without the assembling of the images being cumbersome since the images are converted into character codes before being assembled. The effective resolution is small in a set of characters compared to a bit-map image, thus saving computing power. The effective resolution in the set of characters is a single character. Thus, assembling in two dimensions may be possible with the present invention in a handheld device.

The lines of text in two subsequent images do not necessarily coincide in the vertical direction. The first line in a first recorded image may correspond to the second line in a second recorded image. However, the assembling will adjust the vertical position so that correct assembling is obtained.

By a set of characters is meant a plurality of characters, from which the relative positions of the characters can be determined. The set of characters may be a string of characters comprising characters for blank and end of line.

A device for recording a text images the text on a light-sensitive sensor with a two-dimensional sensor surface, which sensor is intended for digital recording of images of the text, said images having partly overlapping contents. The device is characterized in that it is adapted to convert at least two of the images recorded by the sensor into a set of characters each, comprising a plurality of characters, by means of character recognition. The device is adapted to subsequently assemble the sets of characters with the aid of the characters in the sets of characters.

By carrying out character recognition before assembling the images, the operation of assembling large images at pixel level can be omitted. Moreover, there is less risk that a character would not be recognized owing to poor assembling, which may be the case when digital images are assembled in pixel level and then character recognition is carried out in an area that is overlapped by both images that are assembled. Then, the character may be distorted if the assembling is not carried out properly, which may results in that the character is not recognized in the characters recognition process. According to this invention, the character recognition process take advantage of the original quality of the image for character recognition. By first converting the images into sets of characters, the actual assembling of the sets of characters may be quick since the number of characters is considerably smaller than the number of pixels in the recorded images.

Moreover, by OCR interpretation of each image before the assembly thereof, a plurality of OCR interpretations of the same character will be obtained, one for each image where the character is included, and the interpretation which gives highest recognition probability can be selected.

Alternatively, it is possible to assemble the sets of characters using words in the set of characters. Thus, entire words in one of the sets of characters that are to be assembled are compared with words in the other of the sets of characters that are to be assembled. When assembling words, it may be required to compare each individual character.

By word is meant a plurality of characters which also includes special characters. The special characters are, for example, blank, full stop, comma or end of line.

The method may comprise finding the lines of text in the recorded images, to find start and end of words along the lines of text and to select which of the recorded images are to be converted into sets of characters with the aid of the identified start and end of the words in the recorded images, so that only images with the necessary information are converted into sets of characters or that images with duplicate information may be discarded. By identifying start and end of the words along the lines of text, it will be possible to make a rough assembling of the images without first making optical character recognition. When the start and end of the words have been identified, the recorded images are corrected as regards rotation and perspective. By making a rough assembling of the images, it will be possible to find out how the images overlap each other. The images which contain only information that is available completely in other images then need not be converted into sets of characters, Start and end of words along the lines of text may be identified by searching, in each pixel along a line through the lines of text, for the number of dark pixels a predetermined number of pixels up and down from the line of text. An end of a work being defined as if there are no dark pixels in a predetermined number of pixels above and below the line of text, i.e. there are blanks. To manage italics one may alternatively search along an oblique line. It is, of course, possible to search for white pixels, instead of dark pixels, if the text should be brighter than the background, i.e. inverted.

The images may be converted into binary images, i.e. images containing merely black and white, since this facilitates the continued image processing.

Moreover, the method may comprise finding the lines of text in the recorded images using the Hough transformation of the recorded images. The Hough transformation can briefly be described as follows. There is an infinite number of straight lines extending through a point in an XY plane, The equation of the straight line for each of these lines can be expressed with two parameters, If the parameters of the individual lines are plotted in a diagram, a curve is obtained which corresponds to the Hough transform of the point. In this way, it is possible to plot curves for any of the points in the XY plane. The Hough transform of two different points will intersect in a point, which corresponds to the equation of the straight line extending through the two points. If the Hough transforms for all the dark pixels in a recorded image are plotted, a large number of intersections between the different Hough transforms will be obtained. However, there is a maximum number of intersections for lines following the lines of text.

The device may comprise a memory adapted to store the recorded images, which are to be converted into sets of characters, in the memory, and to convert the stored images into sets of characters after completion of the recording of the images. By only storing the recorded images which are to be converted into sets of characters, the memory space which is required for storing recorded images is minimized. By converting the stored images into sets of characters after the recording of images has been completed, it is not necessary to place high demands on the speed of the optical character recognition, which would be the case if it were to be carried out while images are being recorded.

The device is advantageously designed in such a manner that a user can hold it by hand and at a distance from a substrate to record text on the substrate.

The device may be adapted to correct the images for rotation before they are converted into sets of characters. In the case where the lines of text in the recorded images have been identified, the correction for rotation can be carried out in a relatively simple way. However, some optical character recognition programs can process also rotated images, in which case the rotation is not required.

Correspondingly, the device may correct the images for perspective before they are converted into sets of characters since the optical character recognition may be facilitated if all letters have the same size in the images.

The device may be designed as a reading head which is connected to a calculating unit in which the recorder images are processed.

The device may be adapted to assemble the sets of characters by comparing the sets of characters in pairs, the sets of characters being compared in a number of relative positions displaced relative to each other. Thus, a first character in a first set of characters is compared with characters in the second set of characters until correspondence is achieved or until the first character in the first set of characters has been compared with all characters in the second set of characters. Subsequently, the correspondence of the second characters in the first set of characters is compared with the characters in the second set of characters. By making the comparison for a large number of different relative positions, a plurality of total numbers of points can be obtained, the total number of points reflecting the correspondence between the two sets of characters for the specific position. In this way, an optimum relative position can be obtained.

The device may be adapted to store the recorded images that are to be converted into sets of characters along with a serial number indicating in which order the images have been recorded, and to assemble the sets of characters with the aid of the serial number for the images corresponding to the sets of characters. Especially in the case where first all images are recorded and not until then the character recognition and the assembling are begun, the serial numbers may be used for the recorded images since then a large number of images are to be assembled.

According to a second aspect of the present invention, a method is provided for recording of text on a substrate, comprising the step of imaging and digitally recording images of the text, the images having partly overlapping contents. The method is characterized in that it comprises the steps of converting at least two of the recorded images into a set of characters, each with a plurality of characters, by means of optical character recognition, and putting together the sets of characters with the aid of the characters in the sets of characters.

The area recorded by the sensor may be arranged so that a plurality of lines of text are imaged in a recorded image.

According to a third aspect of the present invention, a computer-readable storage medium, in which a computer program is stored which is adapted to be used for conversion of digital images, which are recorded by an image sensor, into text. The storage medium is characterized in that the computer program comprises instructions for making the computer receive digital images as input signals, convert the digital images into sets of characters, with a plurality of characters, by means of character recognition, and put together the sets of characters with the aid of the characters in the sets of characters.

Further objects, features and advantages of the invention will appear from the following detailed description of embodiments of the invention with reference to the drawings.

BRIEF DESCRIPTION OF THE DRAWINGS

FIG. 3 is a schematic view of images of text on a sheet of paper, which are recorded according to the invention.

FIGS. 4a and 4b are diagrams, illustrating the principle of the Hough transformation.

FIG. 5 is a diagram, which shows maximum points for the Hough transform of two different images.

FIG. 6 is a diagram and a histogram for illustrating the detection of start and end points of words.

FIGS. 7a and 7b are diagrams for illustrating the division of the text images into words.

FIG. 8 is a diagram of two images converted to characters for assembling.

FIGS. 11a, 11b and 11c are shematic representations of a text, division thereof in rectangles and display on a small display.

DETAILED DESCRIPTION OF EMBODIMENTS OF THE INVENTION

Figure 1:
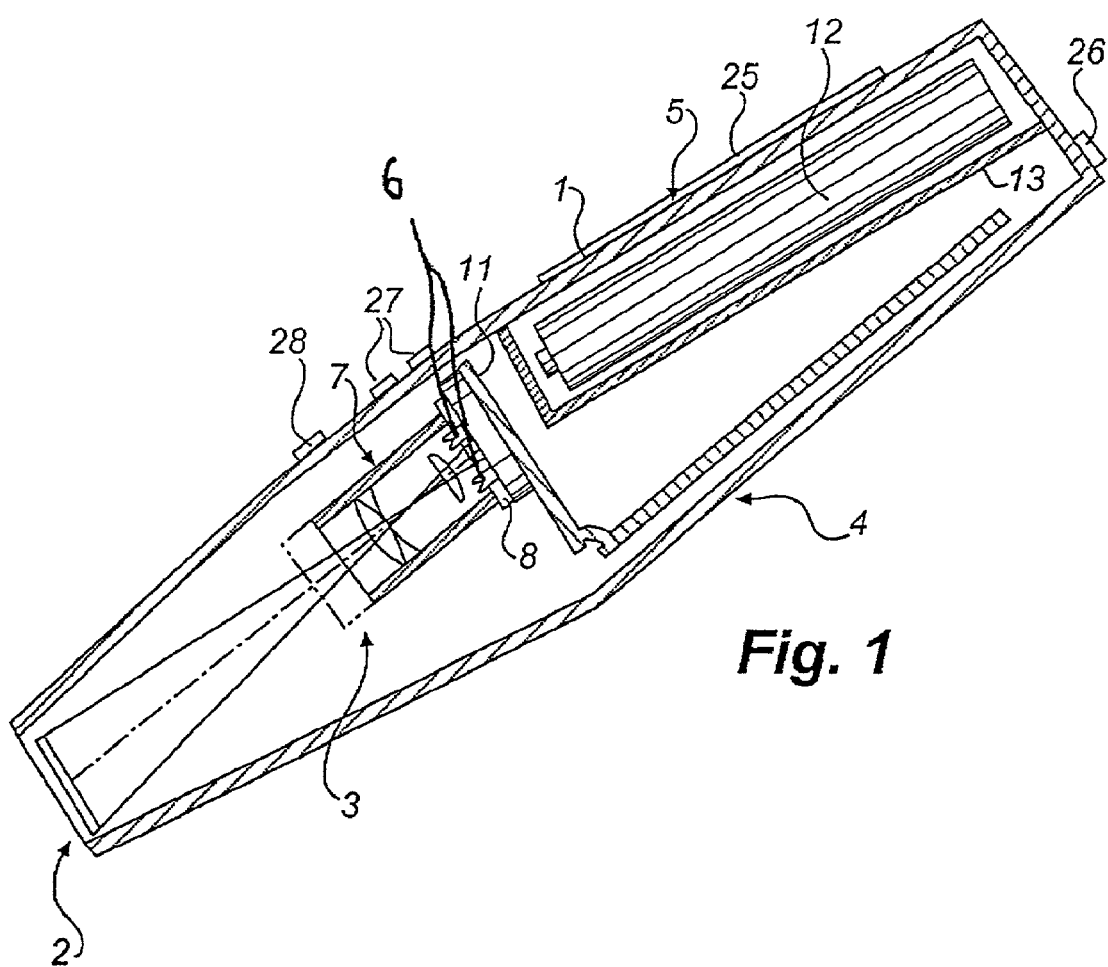
FIG. 1 is a schematic view of a device according to a first embodiment of the present invention.

FIG. 1 discloses a scanner pen, comprises a casing 1 having approximately the same shape as a conventional highlighter. In one short side of the casing there is an opening 2, which is intended to be directed at an area on a substrate which a user wants to image. The information carrier can be a sheet of paper.

The casing 1 essentially contains an optics part 3, an electronic circuitry part 4 and a power supply part 5.

The optics part 3 comprises a lens system 7, light-emitting diodes 6, and an optical sensor 8 constituting an interface with the electronic circuitry part 4. The light-emitting diodes 6 may be used to increase the illumination.

The light-sensitive optical sensor 8 may be a two-dimensional CMOS unit or CCD unit (CCD=Charge Coupled Device) with a built-in AD converter. Such sensors are commercially available. The sensor 8 may be mounted on a printed circuit board 11.

The power supply to the device is obtained from a battery 12 which is mounted in a separate compartment 13 in the charge.

Figure 2:
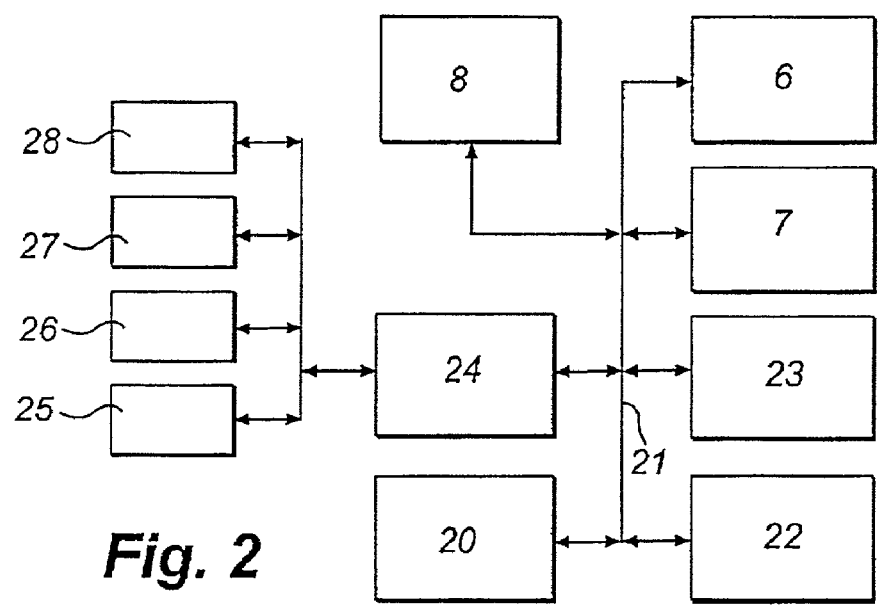
FIG. 2 is a schematic block diagram of parts of the embodiment of FIG. 1.

FIG. 2 is a block schema of the electronic circuitry part 4, which comprises a processor 20 which, via a bus 21, is connected to a read-only memory ROM 22, in which the program of the processor is stored, to a write/read memory RAM 23, which is the work memory of the processor and in which the images from the sensor as well as characters that are interpreted from the recorded images are stored, to a control logic unit 24 and to the sensor 8.

The control logic unit 24 is connected to a number of peripherals, such as a display 25 mounted in the casing, an IR transceiver or short-range radio link 26 for transferring information to/from an external computer, buttons 27 by means of which the user can control the device, and an operation indicating device 28 consisting of a second set of light-emitting diodes which may indicate whether recording occurs or not and other operating conditions. The control logic unit 24 generates control signals to the memories, the sensor and the peripherals. The control logic unit also manages the generation and the prioritization of interrupts to the processor. The buttons 27, the transceiver 26, the display 25 and the light-emitting diodes 6 are controlled by the processor by writing and reading in the records of the control logic unit. The buttons 27 generate interrupts to the processor 20 when activated.

The function of the device will now be described. A sheet of paper 9 is provided with a plurality of lines of printed text 10 as shown in FIG. 3. When a user activates the scanner pen by means of the buttons 27 and passes it across the sheet of paper with the opening 2 directed towards the sheet of paper, three images 14, 15, 16 are recorded. Each of the images 14, 15, 16 is exposed to OCR processing and the text of the images is converted into sets of characters a illustrated in FIG. 8. Subsequently the sets of characters are assembled or stitched so as to form a complete text. As shown in FIG. 3, the images 14, 15, 16 may be rotated in relation to each other. Thus, a first image 14 is turned or rotated in relation to a second image 15, which in turn is rotated in relation to a third image 16.

In order to optimize the optical character recognition in the recorded images 14, 15, 16 it is advantageous to know the orientation of the lines of text in the image. Therefore, the orientation of the lines of text is detected before the character recognition is carried out.

The detection of the orientation of the lines of text may be carried out using the Hough transformation.

Referring to FIGS. 4 and 5, the Hough transformation will now be generally described. FIG. 4*a* shows five points in a plane with the coordinate axes X and Y. FIG. 4*b* shows the Hough transform of the five points in FIG. 4*a*. A first point 18*a* has a first Hough transform curve 19*a* which describes all the straight lines extending through the first point 18*a* in FIG. 4*a* as a function of the parameters θ and ρ where θ is the angle of the straight lines through the point and ρ is the distance of the straight lines from origin. The Hough transform curves have a sinusoidal shape. Correspondingly, the second 18*b*, third 18*c*, fourth 18*d* and fifth 18*e* points have a second 19*b*, third 19*c*, fourth 19*d* and fifth 19*e* Hough transform curve. The second 19*b*, third 19*c* and fourth 19*d* Hough transform curves in FIG. 4*b* intersect in a point. This point in FIG. 4*b* corresponds to a straight line in FIG. 4*a* extending through both the second point 18*b* and the third point 18*c* and the fourth point 18*d*.

Figure 9:
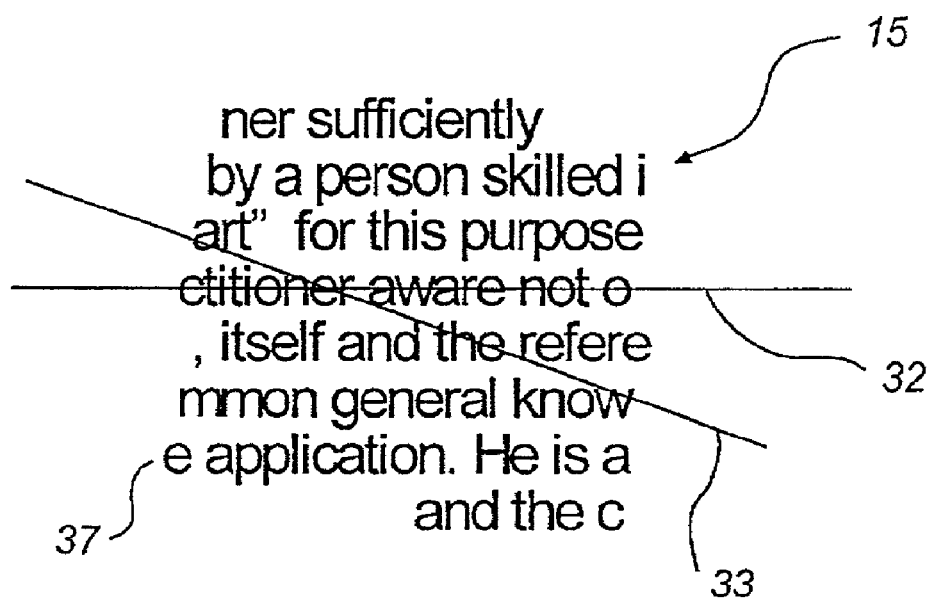
FIG. 9 is a diagram for illustrating lines of text in a recorded image.

FIG. 9 shows the second recorded image 15 from FIG. 3, which consists of a plurality of pixels in which lines of text are to be found. For each black pixel in the second recorded image 15, a Hough transform curve is calculated. The Hough transtorms are inserted in one and the same diagram.

FIG. 9 shows a first line 32 and a second line 33. Lines having approximately the same direction as the first line 32 will intersect a larger number of points than lines having approximately the same inclination as the second line 33 since the dark pixels in the recorded image 15 are positioned along lines of text having approximately the same direction as the first line 32.

FIG. 5 illustrates that the maximum number of intersections can be used to determine the orientation of the lines of text. The circles 73 correspond to points in the Hough transform diagram where several Hough transform curves of points in FIG. 9 intersect, i.e. maximum of intersections. The circles 73 corresponds to the image 15 and are positioned along a straight line 34. From the distance between the circles 73, the distance between the lines of text can be determined. The position of the intersecting line 34 along the θ axle indicates the rotation of the recorded image. The second line 35 in FIG. 5 corresponds to the image 14 and extends through a plurality of maximum indicated by crosses 36 in the diagram. The inclination of the second line 35 indicates that the image has a perspective, i.e. the lines of text have different rotations. Also the sligth different distances between the crosses 36 indicate that the image has a perspective with larger distances between the lines at the lower portion of the line 36. The displacement of the second intersecting line 35 in relation to the first line along the θ axis indicates that the lines of text are rotated in the recorded image. By means of this information, the image may be adjusted for perspective and rotated, for example to the horizontal direction, which is the same direction as image 15. As appears, image 15 corresponding to line 34 need no adjustment, while image 14 corresponding to line 35 needs adjustment of the perspective to make line 36 vertical and with approximately equidistant crosses 36 and adjustment as to the rotational position, to move line 35 to the same angle θ as image 15, which may correspond to zero angle.

After identification of the lines of text, an identification of the start and end parts of the words in the recorded image is carried out. FIG. 6 indicates how the letter "e" 37 is detected. As shown in FIG. 6, the number of dark pixels 7 are counted in the vertical direction perpendicular to the line 38, which may be calculated as described above. The number of dark pixels is zero up to the start 39 of the letter "e" and will again be zero at the end 40 of the letter "e". When the number of dark pixels has been zero for a predetermined period, this is detected as the end of a word.

With reference to FIG. 7, the words are indicated as rectangles, the start 41 of the rectangles indicating the start of a word and the end 42 of the rectangles indicating the end of a word. FIG. 7*a* corresponds to a first recorded image 14 and FIG. 7*b* corresponds to a second recorded image 15. A length of a first word 43 in FIG. 7*a* has correspondence in a length of a second word 44 in FIG. 7*b*. Correspondingly, a length of a third word 45 in FIG. 7*a* has correspondence in a length of a fourth word 46 in FIG. 7*b*. By matching the two images, it is possible to find out how the recorded images overlap each other, by only using the graphical information of the length of each word.

Thus, by using the length of the words for each line, it is possible to carry out a rough putting-together or stitching or assembling of the two images. The images are roughly assembled so that a sequence of word lengths in the first recorded image corresponds to a sequence of word lengths in the second recorded image. The word lengths along different lines in the first recorded image should thus correspond to word lengths along corresponding lines in the second recorded image. In this way, it is possible to determine how the images are displaced relative to each other.

FIG. 3 shows how this may be used to sort out unnecessary images so that optical character recognition need not be carried out am regards all images that are recorded. A first image 47 and a second image 49 completely overlap the area which is covered by a third recorded image 48 which is indicated by dashed lines. By using the method as described in connection with FIG. 7, the third recorded image 48 can be completely omitted, without optical character recognition being carried out. Of course, FIG. 3 is only schematic, since the images often overlap each other to a much larger extent. Indeed, if the scanner pen is held approximately still, all images overlap more or less, and a substantial saving of computing power may be obtained by omitting images with duplicate information. On the other hand, during normal scanning operation, a partial overlap may be used for sorting out errors in the optical character recognition process or the assembling process, in which case overlapping images are not omitted or discarded.

Another method of assembling the images is disclosed in FIG. 8, which shows a first set of characters 50 with a plurality of characters 60 corresponding to the first recorded image 47 in FIG. 3 and a second set of characters 51 with a plurality of characters 61 corresponding to the second recorded image 49 in FIG. 3. The text in the first set of characters and the second set of characters follows the direction of the lines of text 62, which may have been obtained by the Hough transform process described above. The first set of characters 50 and the second sat of characters 51 are put together or assembled by comparing characters in the two sets of characters. Firstly, the first character 52 in the first set of characters is compared with each of the characters in the second set of characters 51. The operation proceeds correspondingly for the second character 63 and the third character 64 in the first set of characters 50. Good correspondence is obtained when the characters in tho word "skilled" 53 in the second line of the first set of characters is compared with the word "skilled" 54 in the first line in the second set of characters 51. Since a word can appear in many positions in a text, one starts from the first correspondence found and then compares the rest of the text for this position, a total number of points being obtained which indicates how well the two sets of characters correspond for this position. Subsequently this step is repeated for the next position where correspondence is obtained. Finally, the position is selected in which the total number of points indicates the best correspondence. In FIG. 8, the text is in English but a person skilled in the art understands that the text could just as well be in any other language and that the text in FIG. 8 is only used to illustrate the function of the device. The image may also comprise symbols, such as mathematical expressions, or even line art, to a limited extent.

The two assembling methods may be combined, so that the images are first compared in a rough manner and then on character level. In this way, it will be possible to carry out assembling in two dimensions with limited computing power. If the reading device is first moved to the right like in FIG. 3 and then down and to the left, a larger surface is obtained which is to be assembled in two directions. By determining the mutual relationship of the partial images by rough assembling and then on character level, it is relatively easy to obtain both horizontal and vertical assembling. The characteristic that the lines determine the vertical position with great accuracy results in the possibility of alignment.

Each assembling method may alternatively be used separately. If the method using length of words is used separately, the images may be assembled into a composite image before final conversion of the images to characters by optical character recognition. This method may be used when the images comprises other matter than text, such as small pictures or symbols. In this case, the symbols or small pictures will be handled as if they were words and be included in a rectangle. The assembling process will work, provided that the pictures or symbols are sufficiently small. However, the OCR process will fail to recognize the rectangle as characters, and then the pixel representation may be used instead. Other types of boarders may be used than rectangles, such as an area delimited by more than four straight lines or even curved lines.

If the assembling is carried out after the conversion of each image to character code such as ASCII, small pictures and symbols may be handled separately, at least if they are surrounded by text matter in each image.

As appears from FIG. 7, the images may be processes by division of the image in boarders, such as rectangles. Each rectangle comprises a complete word or a symbol or a picture surrounded by white areas. Several pictures are compared for finding a succession of rectangles which corresponds to the wanted text. When overlapping positions have been determined, each rectangle is given a succession number, comprising the line number and the word number on that line. Thus, in FIGS. 7a and 7B, the word 41 obtains designation 1:1, the next word 1:2, and the following word 1:3. On the second line, the first work obtains the designation 2:1, the second word 2:2, the third word 2:3 and the fourth word 2:4. Correspondingly, on the third line, the first word obtains designation 3:1, the second word 3:2, the third word 3:3 and the fourth word 3:4. It is now recognized that the fourth word on the second row, 2:4 corresponds to the second word on line 2 of FIG. 7b, which means that the first word a the second line of FIG. 7b obtains designation 2:3, the second word 2:4 (corresponding to the fourth word of line 2 of FIG. 7a), the third word 2:5 and the fourth word 2:6. The same goes or the third line of FIG. 7b, in which the first word obtains designation 3:3, the second word 3:4, the third word 3:5 and the fourth word 3:6. Tho words are than arranged in a row of words forming a complete line.

It can now be seen that several words are duplicated in the two pictures, namely word 2:4 and word 3:4. There are further words which are duplicated on the other lines. These duplications may be omitted and replaced by a single word. Else the duplications may be kept and used for increasing the OCR interpretation accuracy.

Finally, the words are OCR processed in the right order to obtain the desired text.

If any rectangle is larger in the vertical direction than a single line, it may obtain designation like 2,3:6, if it occupies lines two and three. In this way, larger objects such as pictures or symbols may be handled.

There are a number of cases in which partial words are included in FIG. 7a but included in full in FIG. 7b, such as word 1:3. In this case, the longest version of the word is used for interpretation. If there is a doubt if this is correct, all fragments may be used to recreate the complete word.

In this way, the images are assembled on a word basis starting from the pixel representation and dividing the image inside boarders, such as rectangles which are compared for the best overlapping position. Then, duplicate information is omitted or used for further accuracy and then the words are arranged in the right order and finally converted to ASCII-code.

Pictures or symbols which may not be recognised by the OCR program, may be maintained in pixel format and displayed as such in the final picture. For increased safety, also at least one version of the words may be kept in pixel format in parallel with the OCR-version, especially if the OCR program indicates a poor quality of processing.

Every new image is compared with previous information in order to find out its orientation therein. Thus, each image is processed both in the vertical direction as well as in the horizontal direction, both forwards and backwards. Thus, it is possible to scan in two dimensions by the present invention. This is possible because of the division of the image in a coded representation which is less time consuming to process, either in the form of rectangles or similar or in the form of ASCII code.

It may be of interest to have some kind of feed-back that the desired information is gathered. This may he accomplished by displaying the assembled information at the screen. However, since the display at a handheld device is rather small, another method would be to display the lines as a succession of pixels at the display, in which one pixel approximately corresponds to a single character. Then, the characters will form words and the layout of words would give a visual indication of the scanned surface. If the processing comprises division into rectangles, these rectangles may be indicated as they are assembled.

FIGS. 11a, 11b and 11c show how this may be accomplished. FIG. 11a is a text that is to be scanned. FIG. 11b is the division of this text in rectangles. Finally, FIG. 11c is the representation of the rectangles at a small display, in which rectangles are indicated in black pixels and spaces between the rectangles as gray pixels. From FIG. 11c it can be seen that some information is missing as indicated by white pixels 29. The user then directs his scanner pen towards the area missing until the display indicates that all areas are fully covered by at least one image. Finally, the comlete image is converted to ASCII, if that has not been done earlier in the process.

If the assembling is done by using the coded representation in the nature of ASCII code, each decoded character is displayed as a black dot an the display screen, while spaces are displayed as grey dots. Any white dot will indicate that information is missing, as described above.

According to the present invention, it is required that the information at least partially is positioned along identifiable lines. If the device is passed across a photograph or some other surface which is not divided into lines, this can easily be recorded by the processor in the device, and this part of the image may be discarded or stored separately as an picture or photograph. If said surface is completely or at least partially surrounded by lines, it would be possible to handle the situation via the invention, as soon as at least a portion of a line is included in every image.

Figure 10:
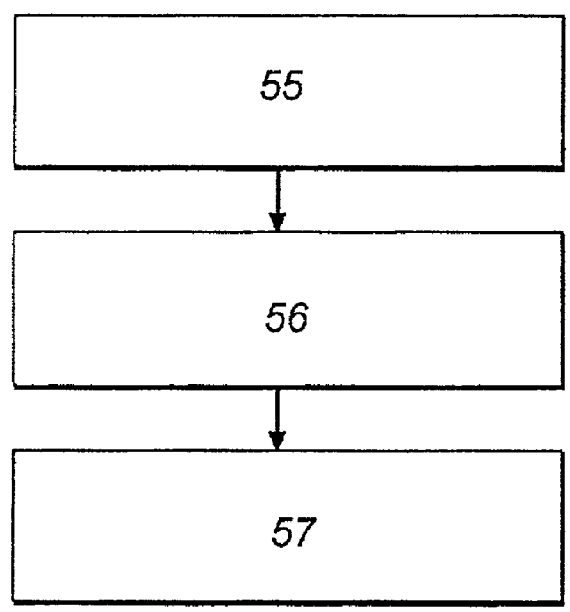
FIG. 10 is a flow chart of the operation of a computer program according to the invention.

FIG. 10 is a flow chart of the operation of a computer program according to the invention. The computer program is adapted to be executed in the electronic circuitry part 4 of the device. In a first step 55, digital images are received from the sensor 8. In a second step 56, the digital images are converted into strings of characters using character recognition. In a third step 57, the strings of characters are assembled or put together.

It is not necessary to carry out the rough putting-together of the recorded images as described in connection with FIG. 7, and optical character recognition can be carried out directly as regards the recorded images. Moreover, the orientation of the lines of text need not be identified in the recorded images if an optical character recognition algorithm is used which is able to identify characters also when the lines of text are rotated.

A person skilled in the art realizes that the invention is not limited to the embodiments shown and that many modifications are feasible within the scope of the invention. The invention is only limited by the appended patent claims.

The invention claimed is:

1. A device for recording information contained in a printed document by scanning the printed document with a scanner pen to obtain at least two images of said information having partially overlapping contents, comprising:
   a processing device for converting coherent pieces of the information in the images to a coded representation of the extent of the pieces of information in at least one dimension;
   a comparison device for comparing the extent of the coherent pieces of information for determining an overlap position between the at least two images; and
   an assembling device including a memory for assembling said at least two images to form a composite image in said memory.

2. A device as claimed in claim 1, wherein said coded representation includes a division of the information inside borders, each comprising portions of the information.

3. A device as claimed in claim 2, wherein said borders include words included in said information.

4. A device as claimed in claim 3, further including a character recognition device for processing each image and converting it to character code format.

5. A device as claimed in claim 1, further including a determining device for determining structures in each of said images.

6. A device as claimed in claim 5, wherein said determining device is adapted to identify direction of lines in each of said images.

7. A device as claimed in claim 6, wherein said determining device is adapted to identify text line directions.

8. A device as claimed in claim 6 or 7, wherein the determining device is adapted to identify direction of lines and text line directions utilizing a Hough transformation of each image.

9. A device according to claim 1, wherein a coherent piece of information is selected from the group of a symbol, a picture and a word.

10. A device according to claim 1, wherein the coherent pieces of information are words and wherein the comparison device is adapted to compare the length of the words in said images.

11. A device according to claim 1, further comprising:
    a character recognition device for processing the composite image and converting it to character code format.

12. A method for recording information contained in a printed document by scanning the printed document with a scanner pen to obtain at least two images of said information having partially overlapping contents, comprising:
    converting coherent pieces of the information in the at least two images to a coded representation of the extent of the pieces of information in at least one dimension;
    comparing the extent of the coherent pieces of information to determine an overlap position between the at least two images; and
    assembling said at least two images to form a composite image.

13. A method as claimed in claim 12, wherein said coded representation includes a division of the information in rectangles each including portions of the information.

14. A method as claimed in claim 13, wherein said rectangles include words included in said information.

15. A method as claimed in claim 14, further including processing each image and converting it to character code format.

16. A method as claimed in claim 12, further including determining structures in each of said images.

17. A method as claimed in claim 16, further including identifying direction of lines in each of said images.

18. A method as claimed in claim 17, further including identifying text line directions.

19. A method as claimed in claim 18, further including identifying direction of lines utilizing a Hough transformation of each image.

20. A method as claimed in claim 19, further including adjusting the perspective of each image in dependence of the direction of lines.

21. A method as claimed in claim 19, further including adjusting the rotational position of each image in dependence of the direction of lines.

22. A computer readable medium storing a program for carrying out the method according to any of claims 12, 13, 14, or 15–21.

23. A method according to claim 12, wherein a coherent piece of information is selected from the group of a symbol, a picture and a word.

24. A method according to claim 12, wherein the coherent pieces of information are words and wherein the step of comparing comprises comparing the length of the words.

25. A method according to claim 12, further comprising:
    a character recognition device for processing the composite image and converting it to character code format.

26. A method for recording information contained in a printed document, comprising:
    recording a plurality of images of the information by scanning the printed document with a scanner pen, the images having partially overlapping contents and each representing a part of the information;

identifying the graphical extent, in at least one dimension, of elements in the image;

converting the elements into coded representations of the graphical extent;

determining the overlap between pairs of images based on a comparison of the graphical extent of the elements; and sorting out the images having redundant content based on the overlap.

27. The method according to claim 26, wherein the information is selected from the group of a symbol, a picture and a word.

28. A device for recording information contained in a printed document, comprising:

an imaging device which records a plurality of images of the information by scanning the printed document, the images having partially overlapping contents and each representing a part of the information;

a processor which identifies the graphical extent, in at least one dimension, of elements in the image and converts the elements into coded representations of the graphical extent;

a comparator which determines the overlap between pairs of images based on a comparison of the graphical extent of the elements; and an extractor which sorts out the images having redundant content based on the overlap.

29. The device according to claim 28, wherein the information is selected from the group of a symbol, a picture and a word.

* * * * *